US007139694B2

United States Patent
(12) United States Patent
Horn et al.

(10) Patent No.: US 7,139,694 B2
(45) Date of Patent: Nov. 21, 2006

(54) METHOD AND SYSTEM FOR TRANFERRING AN ELECTRONIC SUM OF MONEY FROM A CREDIT MEMORY

(75) Inventors: Michael Horn, Munich (DE); Hans-Hermann Wolf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 540 days.

(21) Appl. No.: 10/110,657

(22) PCT Filed: Aug. 7, 2001

(86) PCT No.: PCT/EP01/09138

§ 371 (c)(1), (2), (4) Date: Apr. 15, 2002

(87) PCT Pub. No.: WO02/17254

PCT Pub. Date: Feb. 28, 2002

(65) Prior Publication Data

US 2002/0156746 A1 Oct. 24, 2002

(30) Foreign Application Priority Data

Aug. 18, 2000 (EP) ................................ 00117855

(51) Int. Cl.
*G06F 17/60* (2006.01)

(52) U.S. Cl. ................... 703/69; 705/1; 705/8; 705/17; 705/21; 705/39; 705/42; 705/43; 902/1; 902/8; 902/17; 902/21; 902/39

(58) Field of Classification Search .................... 705/1, 705/8, 17, 21, 39, 42, 43, 69; 902/8 T
See application file for complete search history.

(56) References Cited

U.S. PATENT DOCUMENTS

| | | | | |
|---|---|---|---|---|
| 5,613,012 | A | 3/1997 | Hoffman et al. | |
| 5,802,499 | A * | 9/1998 | Sampson et al. | 705/35 |
| 5,937,396 | A * | 8/1999 | Konya | 705/43 |
| 5,949,044 | A * | 9/1999 | Walker et al. | 235/379 |
| 5,956,700 | A * | 9/1999 | Landry | 705/40 |
| 6,394,907 | B1 * | 5/2002 | Rowe | 463/42 |

FOREIGN PATENT DOCUMENTS

| | | | |
|---|---|---|---|
| DE | 199 03 363 A1 | | 8/2000 |
| FR | 2 780 800 | | 1/2000 |
| JP | 2002259693 | * | 9/2002 |

OTHER PUBLICATIONS

BSIG Policy Statement ,Sep. 23, 2004.*

* cited by examiner

*Primary Examiner*—James P. Trammell
*Assistant Examiner*—John M. Winter
(74) *Attorney, Agent, or Firm*—Bell, Boyd & Lloyd LLC

(57) ABSTRACT

Method for transferring an electronic sum of money from a credit memory associated with a money sender to an account or to a credit memory associated with a money receiver via a telecommunications and data network in real time, the necessary connections being set up via a transaction server.

16 Claims, 4 Drawing Sheets

PREPAID ACCOUNTS
MONEY RECEIVER
MONEY SENDER
SERVER
PREPAID SHOPPING APPLICATION
B1
LOG RECORD
SHOPPING DB
MONEY RECEIVER
MONEY SENDER
CASH REGISTER
B1
OT
SWITCH
SWITCH
B1
PREPAID TELEPHONE MONEY SENDER
MONEY SENDER

B1
LOG RECORD
SERVER
PREPAID SHOPPING APPLICATION
PREPAID ACCOUNTS
MONEY RECEIVER
MONEY SENDER
SHOPPING DB
MONEY RECEIVER
MONEY SENDER
SWITCH
B1
MONEY SENDER
CASH REGISTER
OT
SWITCH
B1
PREPAID TELEPHONE MONEY SENDER

B1
PREPAID ACCOUNTS
MONEY SENDER
LOG RECORD
SERVER
PREPAID SHOPPING APPLICATION
e.g.: FT, HTML, etc.
SERVER
PREPAID SHOPPING APPLICATION
SERVER
PREPAID SHOPPING APPLICATION
PREPAID ACCOUNTS
MONEY RECEIVER
LOG RECORD
SHOPPING DB
MONEY RECEIVER
MONEY SENDER
MONEY SENDER
B1
SWITCH
ISUP
OT
SWITCH
PREPAID TELEPHONE
MONEY RECEIVER
B1

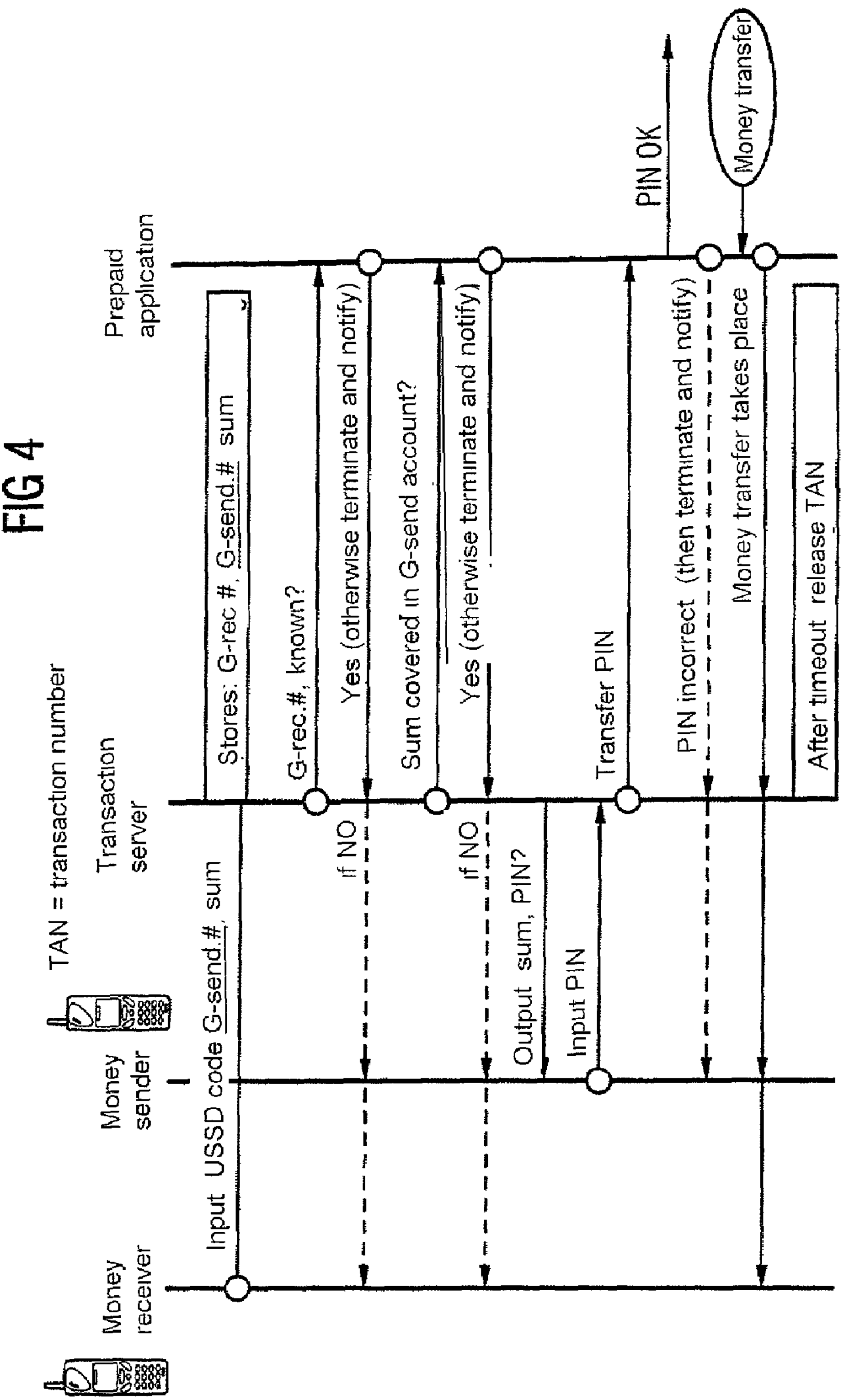
FIG 4
TAN = transaction number
Money receiver
Money sender
Transaction server
Prepaid application
Input USSD code G-send.#, sum
Stores: G-rec #, G-send.# sum
G-rec.#, known?
Yes (otherwise terminate and notify)
If NO
Sum covered in G-send account?
Yes (otherwise terminate and notify)
If NO
Output sum, PIN?
Input PIN
Transfer PIN
PIN incorrect (then terminate and notify)
PIN OK
Money transfer
Money transfer takes place
After timeout release TAN

METHOD AND SYSTEM FOR TRANFERRING AN ELECTRONIC SUM OF MONEY FROM A CREDIT MEMORY

BACKGROUND OF THE INVENTION

The present invention relates to a method and to a system for transferring an electronic sum of money from a credit memory to an account or to another credit memory via a telecommunications and data network.

Besides for use as a communication vehicle and a source of information for what has now become hundreds of millions of people, the Internet is becoming increasingly important as a source of shopping. Particularly trade in software, books and travel is already being carried out on the Internet in a significant proportion today, but also a broad spectrum of other goods and services is increasingly being ordered and paid for over the Internet. Paying for the relevant services on the Internet in the manner which was established originally and is still generally widespread today requires the relevant data records to be input separately in each case, at least by each party to the transaction, if not even for the individual transaction. This mode of payment thus allows the party to the transaction to see sensitive personal data and even to store them permanently.

The Internet now also has become considerably important for handling other payment operations in the business and private sectors. Virtually all banks in industrial states offer electronic handling of account management and of payment operations in the form of "electronic banking".

Nevertheless, the majority of payment operations in day-to-day life are, even today, still performed using cash or by providing transfer or direct debit orders or the like in writing, or by credit card or check card. In specific areas, such as in mobile radio technology, electronic credits ("prepaid cards") have also become significant, but considerable obstacles prevent this way of paying from being introduced on a widespread basis.

Altogether, it can be stated that, in the current state of development, there are an extremely confusing large number of options for paying for goods or services, and using these options in day-to-day life requires considerable alertness and a wide variety of media and modes of entry to be dealt with. This is demanding and is also associated with diverse security risks (losing data media or credit media, forgetting account data and authentication codes etc.).

Besides the Internet, telecommunications (particularly, mobile telecommunications) today represents an area of rapid technical and economic development and a significant source of economic growth and new social developments. For many of the people in industrial states, the mobile telephone ("mobile") is increasingly becoming a universal communication and information instrument and is also increasingly being used to access goods and services. This development is also still hindered by insufficient opportunities for reliable and, at the same time, simple payment for information, goods and services ordered using a mobile.

Although solutions exist which allow the user of a mobile, with or without a prepaid card, to authorize payments, which are then processed in a conventional manner by debit procedures or credit card debiting, these methods presuppose, as do payment processing procedures which now have been introduced on the Internet, that the purchaser is creditworthy and has authority to use a credit card or a current account with an overdraft facility. In addition, these procedures have inherent time lags which have an adverse effect on the transparency and reliability of the overall processing.

The present invention is, therefore, directed toward specifying a method and a system for simplified processing of payment transactions using a data network.

SUMMARY OF THE INVENTION

The present invention encompasses the fundamental concept of specifying a largely universal payment method on the basis of an electronic credit (prepaid account or card) which can be used for payment processing in the "B2C (Business-2-Consumer) sector" and also in the "C2C (Consumer-2-Consumer) sector"; that is to say, allows shopping in real and virtual shops, payment in catering or cultural establishments, etc., and the "transfer" of sums of money in the private sector. It also encompasses the concept of using the opportunities of a combined telecommunications and data network in this regard; specifically, the opportunity for processing in real time.

In the present case, an electronic credit is understood as a memory content of a credit memory which can be operated via a telecommunications or data network in order to perform payment transactions—in principle regardless of whether the memory actually has a prepaid credit or whether a credit sum is not transferred until a later time. In the description below and in the patent claims, the holder of the prepaid credit who wishes to transfer a sum of money and is in a (real or virtual) shop as a purchaser and in a catering establishment as a guest is referred to generally as the "money sender". The receiver of the sum of money to be transferred, who usually will be the owner or operator of a shop or of a catering or cultural establishment or the like in daily life, is referred to generally as the "money receiver" below. In addition, the money receiver and the money sender also may be applications.

The central piece in the proposed system and in the proposed method is a transaction server which accesses a transaction database storing the data relevant for transferring prepaid credits. The transfer operation is initiated by the money sender or the money receiver calling the transaction server, specifically using a service call number or a special number for a service (e.g. 09XX); further connections are set up by the transaction server itself.

The sum of money to be transferred is input by the money sender or receiver on his/her respective terminal or on a cash register or other input device connected thereto. This also can be done in the second phase of a procedure in which the call number of the server is input and dialed, and the money sender or receiver is asked via an announcement or menu guidance to input the sum of money. He/she then makes the relevant input in response to this request.

In the case where a special number is used to set up a connection to the transaction server, an "originating trigger" in the switch of the caller (money receiver or money sender) is used to identify the special number, to actuate the server (e.g., a service control centre (SCP) in an intelligent network) and to activate the requested prepaid shopping application.

This application is preferably used within the scope of a subscription by the money receiver. In this context, the money receiver will normally specify a bank account to which the money transferred to his/her electronic credit memory within the scope of the prepaid shopping application is ultimately transferred. The transaction currency also can be specified. The money sender does not need to take out a subscription for the money transfer procedure. For security reasons, however, it is preferable for the money transfer to be authorized using predetermined authentication procedures; in this regard, see below.

The preferred subscription to the service by the money receiver is likewise not absolutely necessary. With no formal subscription, however, it is not possible to specify any bank details, wherein the sum of money transferred to the electronic credit memory ("prepaid account") cannot be transferred further. Since, additionally, a currency cannot be specified, the application is normally limited to the currency which is valid in the country of the money sender or receiver. In this form, the method is particularly suitable for the transfer of money between private persons ("C2C").

When the connection or connections have been set up to the transaction server, the inputs and outputs required can be made firstly using a voice connection with voice input or DTMF input and voice output and secondly via the exchange of text messages (particularly, SMS or e-mail) or else using a combination of these.

The aforementioned subscription process involves a data record relating to the money receiver being stored in the transaction database ("shopping database"). The money receiver's account needs to be suitable for the management of electronic credits. Likewise, it can be a prepaid account, in particular. The money receiver can use a number of telephone numbers and a number of destination accounts for the transfer of money, in which case all the telephone numbers to be used and account identifiers for all the accounts naturally need to be stored in the shopping database. (The term "account identifier" is understood below to be an account number or an account code and the possibly required server address of an external server on which the account is managed, as a whole.) Besides the aforementioned data, the money receiver data record stored in the transaction database also includes a name or company name.

Besides the information relating to the money receiver, the shopping database preferably also contains the information about the money sender which is required for performing the money transfer. This money sender data record expediently contains the account number of his/her prepaid account and, if required, the server address of an external server on which the prepaid credit is managed (also occasionally referred to in the present case as "account identifier" below), advantageously also the server and operator names and, finally, an authentication data record for authenticating larger money transfers at least optionally on a case by case basis. The "address" or "key" used for this data record is expediently the money sender's call number.

The money sender data record also can be stored in a separate prepaid database.

A fundamental security component is the aforementioned authentication data record within the money sender data record. The authentication data record includes, in particular, an authentication code (PIN or the like) and/or biometric data for the money sender (e.g. papillary line or retina pattern), which code and data are used for authorizing money transfers on a case-by-case basis. This code and these data are input on the money sender's terminal or on an input unit associated therewith, are transmitted to the transaction server and are compared there with the corresponding stored data. As a result of the comparison, the transaction is enabled or blocked.

In one preferred implementation of the method the aforementioned authorization steps are not performed for very small sums, but only for sums of money which exceed a predetermined threshold value. This threshold value can be set and changed by the service provider or the money sender himself/herself.

The proposed solution includes the function blocks (1) start the money transfer procedure, (2) debit the money sender and (3) credit the money receiver. These function blocks can be executed on one and the same server or on different servers, which is/are collectively referred to by the term "transaction server". The server or servers can exist centrally with a service provider or in a number of hardware implementations with this service provider or else with a plurality of service providers. The prepaid shopping application has, as already mentioned above, access to a "shopping database" which (according to the specific network and application concept) likewise can be provided centrally at one point, distributed over a number of points or else in a number of copies at various points.

The method and system are in the simplest form when the money sender's prepaid credit, the money receiver's destination account and the prepaid shopping application itself are managed or operated with one and the same service provider. If this is not the case, clearing (known as such) needs to take place for the money transfer. For this process, the documentation produced for the debiting and crediting process, particularly in the form of "log records", can be used. As a real time method, the proposed method affords improved transparency and reliability as compared with known payment processing methods and can also be used, in particular, by people who have not been granted a credit facility. The user need merely have a prepaid credit ensuring sufficient coverage of the envisaged money transfer.

In addition, the proposed system affords the considerable advantage that the electronic money held in a prepaid account can be used not only for paying for a service having a narrow specification (specifically telephone calls), but also in diverse ways for paying for goods, service, information etc. in real or in virtual sales establishments of all kinds. Prepayment of the credit gives the user strict cost control and, in principle, it is not possible to get into debt unintentionally. As such, this method can be used with particular advantage for minors (or else for older people who are no longer in full possession of their mental faculties) as well, for whom there has been no comparable application to date. For paying for goods and services from different suppliers, a number of prepaid cards or terminals is no longer required, but rather it is only necessary to store a single server call number.

Additional features and advantages of the present invention are described in, and will be apparent from, the following Detailed Description of the Invention and the Figures.

BRIEF DESCRIPTION OF THE FIGURES

FIG. 4 illustrates an exemplary transaction between a money sender and a money receiver using a transaction server and prepaid application.

DETAILED DESCRIPTION OF THE INVENTION

Figure 1:
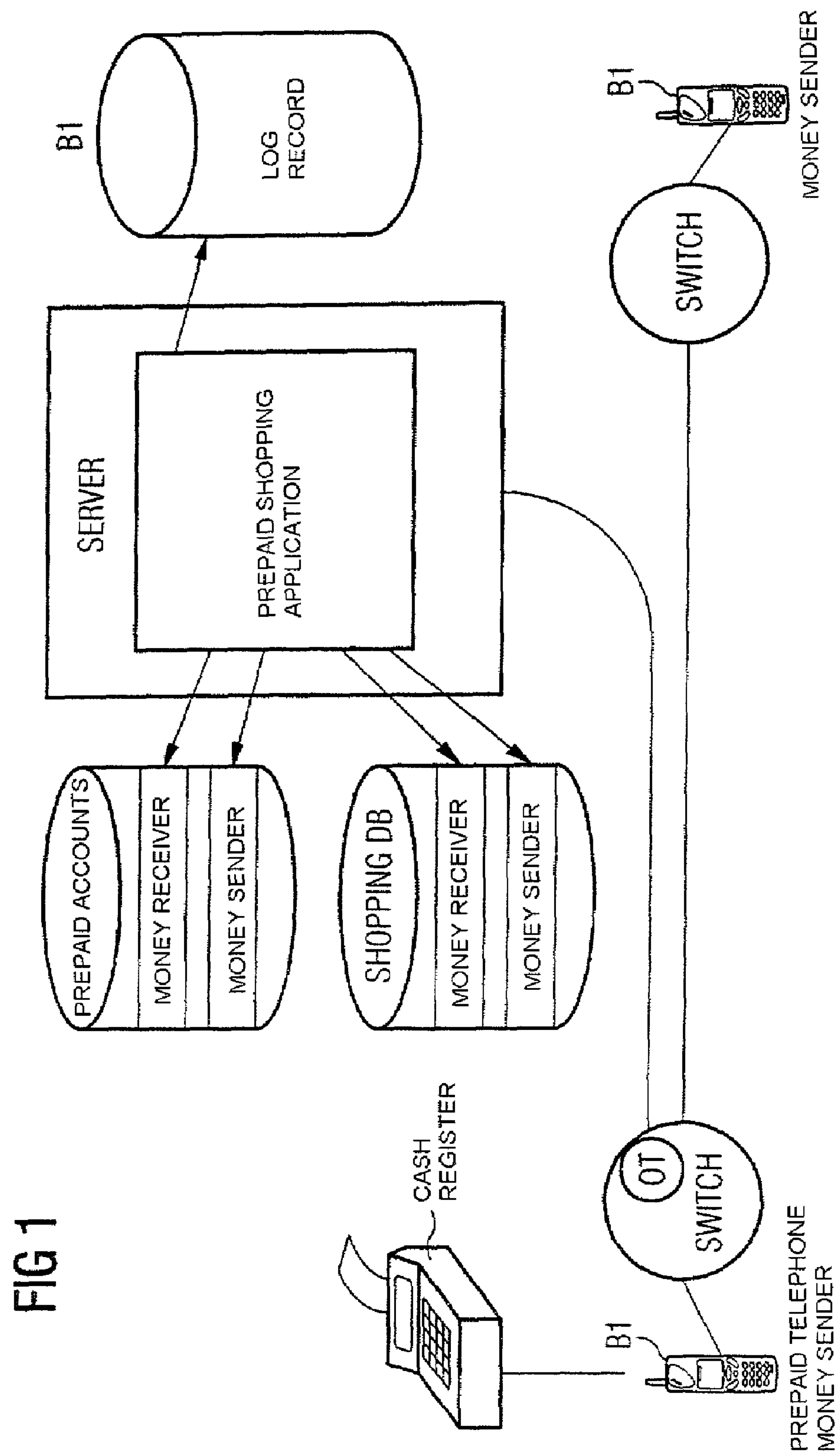
FIG. 1 shows a greatly simplified function block diagram of a first exemplary embodiment of the inventive system.
Figure 2:
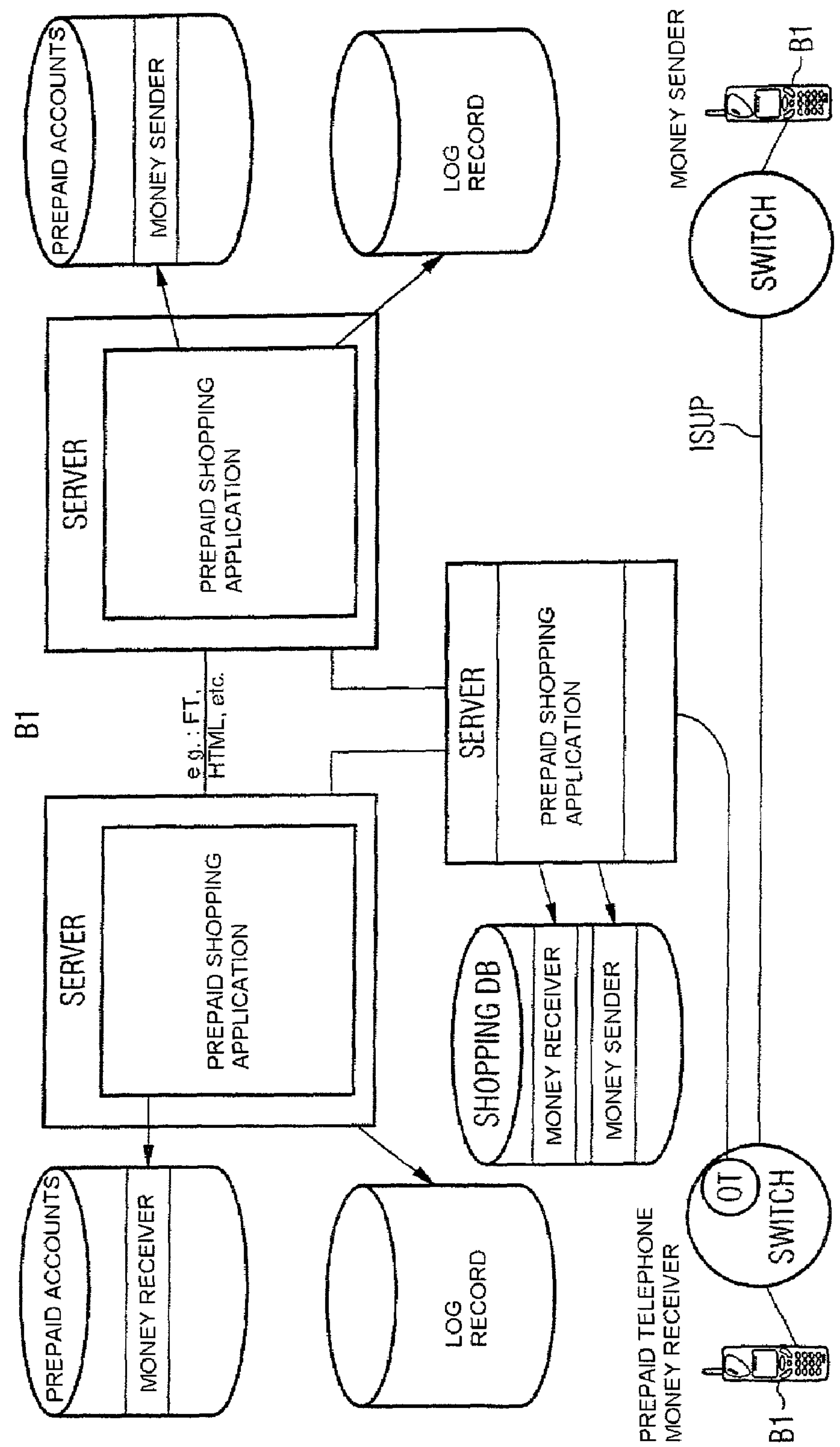
FIG. 2 shows a greatly simplified function block diagram of a second exemplary embodiment of the inventive system.
Figure 3:
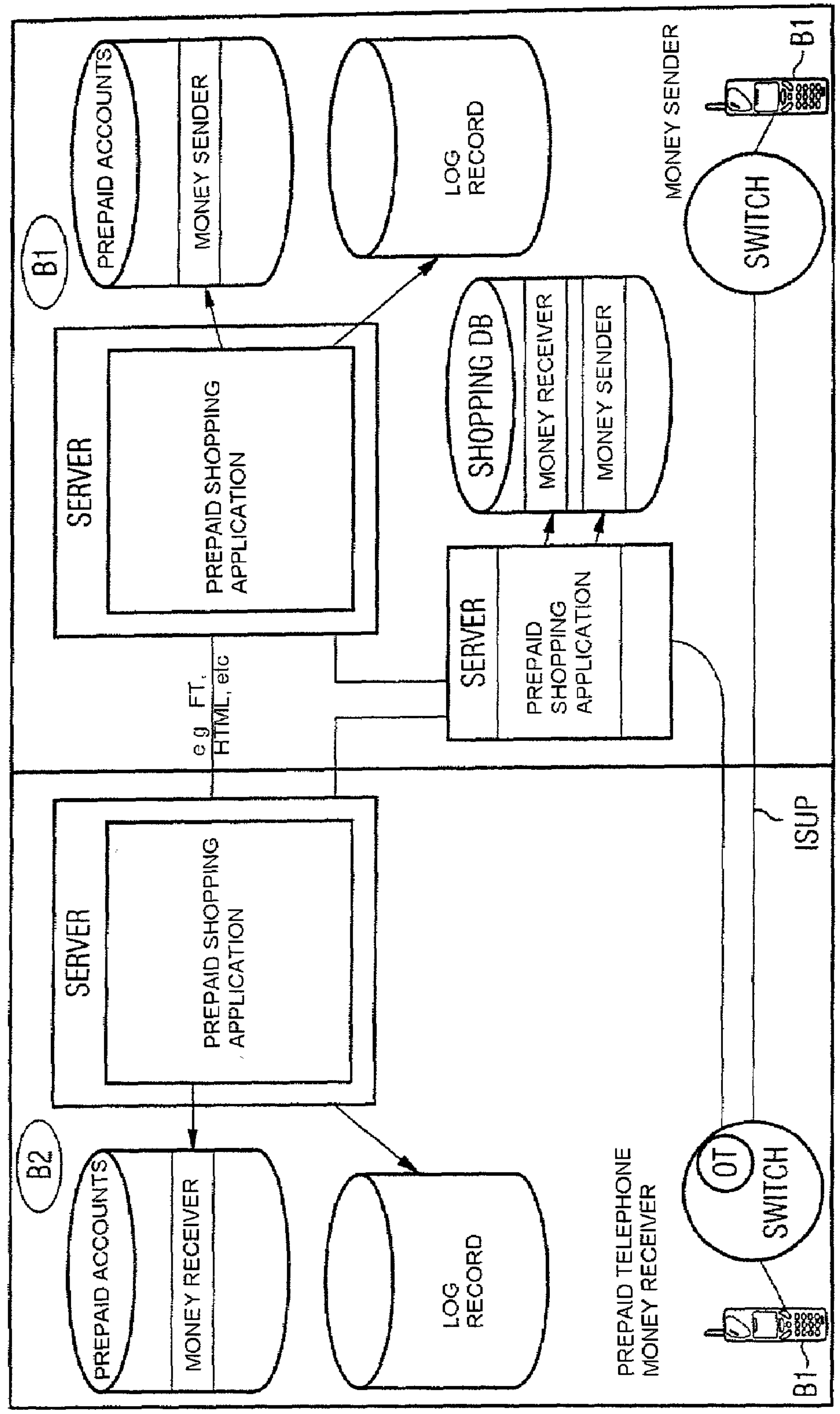
FIG. 3 shows a greatly simplified function block diagram of a third exemplary embodiment of the inventive system.

It should be pointed out that, in FIG. 1, the assumption is made that the prepaid shopping application runs on the same server as that on which prepaid accounts of the money receiver and money sender are managed. By contrast, FIG. 2 shows the situation in which prepaid accounts of the money sender and money receiver are managed on a different server (belonging to the same operator B1) than that on which the prepaid shopping application is running. FIG. 3 shows the situation in which the prepaid shopping application and prepaid accounts which it operates are managed on different servers belonging to different operators B1, B2. FIGS. 1 to 3 show the case in which the transaction server is called by the money receiver's terminal; if they are modified by replacing the connection between the money receiver's switch and the server with a connection between the money sender's switch and the server, they show the case in which the money sender calls the transaction server.

The money transfer process is initiated, by way of example, by the money receiver calling the transaction server SERVER. In this case, following a special call number, the prepaid call number of the money sender and, separated therefrom by a star (*), the sum of money to be transferred in the relevant currency are first entered as an unstructured digit sequence on the money sender's terminal. In another variant, a direct call number for the transaction server is entered in order to start the prepaid shopping application there. The inputs are made, in particular, using the keypad on the terminal, or the like. In principle, voice input is also possible within the context of appropriately designed menu guidance, however. Provided that the price has not been input in connection with the dialing process, the prepaid shopping application starts an announcement which asks the calling party to input the price. The caller then inputs the price.

The prepaid shopping application on the transaction server then transfers the data required for transferring the money (in particular the call numbers of money receiver and money sender and the sum of money) to a prepaid application on a corresponding server. This can be the transaction server itself (FIG. 1) or at least one server belonging to the same operator (FIG. 2) or at least one server belonging to another operator (FIG. 3). The applications can also run on different servers, having been distributed in modules.

When the data have been transmitted, wherein the money transfer procedure has been started, a checking process is first carried out to determine whether the data medium is valid and whether the sum in the money sender's prepaid account is sufficient for the envisaged transfer process. If both are the case, the money sender is asked to input his/her PIN in order to authorize the debit operation on the sum of money to be transferred.

An exemplary checking process illustrated in FIG. 4 involves the prepaid shopping application accessing the shopping database and reading the money receiver data record and the money sender data record with the information contained therein regarding which server or which servers (and which operator or which operators) hold the accounts of the money receiver and the money sender. The server belonging to the money sender is identified and, if it is a server other than that on which the prepaid shopping application is running, a real time connection to a prepaid shopping application running on this foreign server is set up. The prepaid shopping application on the money sender's server is sent a request to check whether the electronic credit in the money sender's prepaid account is sufficient for the envisaged money transfer. If this is not the case, the transfer is terminated with a corresponding advice signal to the terminal of the money receiver. If the sum of money to be transferred is covered, it is reserved in the money sender's prepaid account.

The aforementioned authorization is given by virtue of the money sender inputting the PIN on the money receiver's reader. The PIN which is input is compared with the PIN stored in the money sender data record. If it is valid, the debiting process is initiated. If it is not valid, the transaction is terminated at this point and a corresponding advice signal is again transmitted.

The sum of money to be transferred is then debited from the money sender's prepaid account. This process is time critical and is performed in real time. If the money sender's prepaid account is on the same server as the prepaid shopping application, the credit can immediately (in real time) be reduced by the sum of money to be transferred. If the account is on a foreign server, the debit request needs to be made to the prepaid shopping application on that server, and the debit operation is performed under that application's regime. In each case, a log record is produced for the debiting process, and the money receiver is informed about the debit operation having been performed via the cash register system or a call or by SMS or the like. The sum of money to be transferred is then credited to the money receiver's account, which can be a prepaid account, a real time account or a normal bank current account. This process is not time critical but needs to take place with the utmost reliability. In this case, too, a distinction needs to be made between the aforementioned variants for debiting, according to whether or not the account is managed on a foreign server. A log record is also produced for the crediting process.

Although the present invention has been described with reference to specific embodiments, those of skill in the art will recognize that changes may be made thereto without departing from the spirit and scope of the present invention as set forth in the hereafter appended claims.

The invention claimed is:

1. A method for transferring an electronic sum of money in real time from a money sender credit memory, which contains a prepaid credit, to a money receiver credit memory, which may be an account, via a telecommunications and data network, the method comprising the steps of:

storing a money receiver data record, including at least one call number for a terminal associated with the money receiver in the telecommunications network and an account identifier for the money receiver credit memory, in at least one of a transaction database and a credit management database, with at least the call number being stored in the transaction database, within a context of a subscription of the moneys receiver to a money transfer service with a service provider;

storing a money sender data record, including at least one call number for a terminal, an account identifier for the money sender credit memory and an authentication data record for the money sender, in at least one of the transaction database and the credit management database, setting up a connection between one of the money receiver terminal and a money sender terminal and a transaction server associated with the service provider using one of a service call number and a special number;

inputting the call number of the terminal of the respective party to the money transfer;

inputting the sum of money to be transferred on the respective one of the money receiver terminal and the money sender terminal and transmitting the sum of money to the transaction server;

reading, via the transaction server, the money receiver data record and, as desired, the money sender data record from the transaction database;

evaluating, via the transaction server, the money receiver data record and, as desired, the money sender data record, including setting up an optionally required data link to at least one external application;

documenting, via the transaction server, a debit and a credit operation in the form of a log record;

checking a coverage of the sum of money in the money sender credit memory;

reserving the sum of money if the sum of money is covered;

terminating the process with signaling if the sum of money is not covered;

debiting the sum of money from the money sender credit memory, and documenting same, if the sum of money is covered;

crediting the sum of money to the money receiver credit memory, and documenting same, if the sum of money is covered;

transmitting respective information about at least one of the debit and the credit operation to, respectively, the at least one of the money receiver terminal and the money sender terminal, wherein the authentication data record in the money sender data record includes at least one of an authentication code and biometric data for the money sender and, before the debit operation step, authorization of the debit operation is performed, which further comprises the steps of:

inputting the at least one of the authentication code and the biometric data by the money sender on a respective terminal;

transmitting the input to the transaction server;

comparing the transmitted data to the data held in the money sender data record;

outputting a debit enable signal if there is a match between the transmitted data and the data held in the money sender data record; and outputting a debit blocking signal if there is no match between the transmitted data and the data held in the money sender data record.

2. A method for transferring an electronic sum of money as claimed in claim 1, wherein the sum of money to be transferred is input in connection with the server call number.

3. A method for transferring an electronic sum of money as claimed in claim 1, the method further comprising the steps of:

generating, via the transaction server, a request for input of the sum of money to be transferred;

transmitting, via the transaction server, the request to at least one of the money sender and the money receiver;

outputting the request on, respectively, at least one of the money sender terminal and the money receiver terminal; and inputting the sum of money on the respective terminal in response to the request.

4. A method for transferring an electronic sum of money as claimed in claim 1, the method further comprising the step of performing authorization of the debit operation for a sum of money which exceeds a predetermined threshold value which can be set by one of the service provider and the money sender.

5. A method for transferring an electronic sum of money as claimed in claim 1, wherein the method is performed by setting up a data link to at least one external server on which at least one of the money sender credit memory and the money receiver data record are managed, with the account identifier of the money data record including one of a server address and a server call number, and the transaction server being connected thereto after reading out the money receiver data record and the money sender data record in order to perform subsequent steps.

6. A method for transferring an electronic sum of money as claimed in claim 1, wherein the money receiver takes out a subscription with the service provider using at least one of a plurality of accounts and a plurality of call numbers, with a number of accounts being less than a number of call numbers, and with all corresponding account identifiers and the call numbers being stored in the money receiver data record.

7. A system for transferring an electronic sum of money in real time from a money sender credit memory, which contains a prepaid credit, to a money receiver credit memory, which may be an account, via a telecommunications and data network, the system comprising:

at least one account management server having the money sender credit memory and the money receiver credit memory;

a money receiver terminal connected to the telecommunications and data network;

a money sender terminal connected to the telecommunications and data network;

a transaction database associated with a service provider, which stores a money receiver data record, including at least one of a transaction call number of the money receiver terminal and an account identifier for the money receiver credit memory, and a money sender data record including at least one of the call number of the money sender terminal and an account identifier for the money sender credit memory, and optionally an authentication data record; and a transaction server connected to the transaction database, to at least one of the money sender terminal and the money receiver terminal via one of a server call number and a special number, and to the account management server, for reading and evaluating the money receiver data record and the money sender data record from one of the transaction database and the account management server, for setting up an optionally required data link to at least one external application and for controlling a coverage check and a debit operation in the money sender credit memory and a credit operation on the money receiver credit memory, wherein the transaction server documents a debit operation and a credit operation in the form of a log record, and wherein the telecommunications and data network includes a mobile radio network, with at least one of the money sender terminal and the money receiver terminal being one of a mobile radio terminal and a data processing unit equipped with a mobile radio part, and the transaction server having an associated mobile radio terminal.

8. A system for transferring an electronic sum of money as claimed in claim 7, wherein the transaction database and at least one of the money sender credit memory and the money receiver credit memory are implemented on the transaction server.

9. A system for transferring an electronic sum of money as claimed in claim 7, wherein the transaction server has associated telecommunication capabilities for signaling termination of at least one of a transaction operation, a debit operation and a credit operation to at least one of the money sender terminal and the money receiver terminal.

10. A system for transferring an electronic sum of money in real time from a money sender credit memory, which contains a prepaid credit, to a money receiver credit memory, which may be an account, via a telecommunications and data network, the system comprising:

at least one account management server having the money sender credit memory and the money receiver credit memory;

a money receiver terminal connected to the telecommunications and data network;

a money sender terminal connected to the telecommunications and data network;

a transaction database associated with a service provider, which stores a money receiver data record, including at least one of a transaction call number of the money receiver terminal and an account identifier for the money receiver credit memory, and a money sender data record including at least one of the call number of the money sender terminal and an account identifier for the money sender credit memory, and optionally an authentication data record; and a transaction server connected to the transaction database, to at least one of the money sender terminal and the money receiver terminal via one of a server call number and a special number, and to the account management server, for reading and evaluating the money receiver data record and the money sender data record from one of the transaction database and the account management server, for setting up an optionally required data link to at least one external application and for controlling a coverage check and a debit operation in the money sender credit memory and a credit operation on the money receiver credit memory, wherein the telecommunications and data network includes a mobile radio network, with at least one of the money sender terminal and the money receiver terminal being one of a mobile radio terminal and a data processing unit equipped with a mobile radio part, and the transaction server having an associated mobile radio terminal.

11. A method for transferring an electronic sum of money in real time from a money sender credit memory, which contains a prepaid credit, to a money receiver credit memory, which may be an account, via a telecommunications and data network, the method comprising the steps of:

storing a money receiver data record, including at least one call number for a terminal associated with the money receiver in the telecommunications network and an account identifier for the money receiver credit memory, in at least one of a transaction database and a credit management database, with at least the call number being stored in the transaction database, within a context of a subscription of the moneys receiver to a money transfer service with a service provider;

storing a money sender data record, including at least one call number for a terminal, an account identifier for the money sender credit memory and an authentication data record for the money sender, in at least one of the transaction database and the credit management database, setting up a connection between one of the money receiver terminal and a money sender terminal and a transaction server associated with the service provider using one of a service call number and a special number;

inputting the call number of the terminal of the respective party to the money transfer;

inputting the sum of money to be transferred on the respective one of the money receiver terminal and the money sender terminal and transmitting the sum of money to the transaction server;

reading, via the transaction server, the money receiver data record and, as desired, the money sender data record from the transaction database;

evaluating, via the transaction server, the money receiver data record and, as desired, the money sender data record, including setting up an optionally required data link to at least one external application;

checking a coverage of the sum of money in the money sender credit memory;

reserving the sum of money if the sum of money is covered;

terminating the process with signaling if the sum of money is not covered;

debiting the sum of money from the money sender credit memory, and documenting same, if the sum of money is covered;

crediting the sum of money to the money receiver credit memory, and documenting same, if the sum of money is covered; and transmitting respective information about at least one of the debit and the credit operation to, respectively, the at least one of the money receiver terminal and the money sender terminal, wherein the telecommunications network and data link includes a mobile radio network, with at least one of the money sender terminal and the money receiver terminal being one of a mobile radio terminal and a data processing unit equipped with a mobile radio part, and the transaction server having an associated mobile radio terminal.

12. A method for transferring an electronic sum of money in real time from a money sender credit memory, which contains a prepaid credit, to a money receiver credit memory, which may be an account, via a telecommunications and data network, the method comprising the steps of:

storing a money receiver data record, including at least one call number for a terminal associated with the money receiver in the telecommunications network and an account identifier for the money receiver credit memory, in at least one of a transaction database and a credit management database, with at least the call number being stored in the transaction database, within a context of a subscription of the moneys receiver to a money transfer service with a service provider;

storing a money sender data record, including at least one call number for a terminal, an account identifier for the money sender credit memory and an authentication data record for the money sender, in at least one of the transaction database and the credit management database, setting up a connection between one of the money receiver terminal and a money sender terminal and a transaction server associated with the service provider using one of a service call number and a special number;

inputting the call number of the terminal of the respective party to the money transfer;

inputting the sum of money to be transferred on the respective one of the money receiver terminal and the money sender terminal and transmitting the sum of money to the transaction server;

reading, via the transaction server, the money receiver data record and, as desired, the money sender data record from the transaction database;

evaluating, via the transaction server, the money receiver data record and, as desired, the money sender data record, including setting up an optionally required data link to at least one external application;

documenting, via the transaction server, a debit and a credit operation in the form of a log record;

checking a coverage of the sum of money in the money sender credit memory;

reserving the sum of money if the sum of money is covered;

terminating the process with signaling if the sum of money is not covered;

debiting the sum of money from the money sender credit memory, and documenting same, if the sum of money is covered;

crediting the sum of money to the money receiver credit memory, and documenting same, if the sum of money is covered;

transmitting respective information about at least one of the debit and the credit operation to, respectively, the at least one of the money receiver terminal and the money sender terminal; and performing authorization of the debit operation for a sum of money which exceeds a predetermined threshold value which can be set by one of the service provider and the money sender.

13. A method for transferring an electronic sum of money as claimed in claim 12, wherein the sum of money to be transferred is input in connection with the server call number.

14. A method for transferring an electronic sum of money as claimed in claim 12, the method further comprising the steps of:

generating, via the transaction server, a request for input of the sum of money to be transferred;

transmitting, via the transaction server, the request to at least one of the money sender and the money receiver;

outputting the request on, respectively, at least one of the money sender terminal and the money receiver terminal; and inputting the sum of money on the respective terminal in response to the request.

15. A method for transferring an electronic sum of money as claimed in claim 12, wherein the method is performed by setting up a data link to at least one external server on which at least one of the money sender credit memory and the money receiver data record are managed, with the account identifier of the money data record including one of a server address and a server call number, and the transaction server being connected thereto after reading out the money receiver data record and the money sender data record in order to perform subsequent steps.

16. A method for transferring an electronic sum of money as claimed in claim 12, wherein the money receiver takes out a subscription with the service provider using at least one of a plurality of accounts and a plurality of call numbers, with a number of accounts being less than a number of call numbers, and with all corresponding account identifiers and the call numbers being stored in the money receiver data record.

* * * * *